United States Patent [19]
Burke

[11] Patent Number: 4,886,222
[45] Date of Patent: Dec. 12, 1989

[54] ATMOSPHERIC AUTOROTATING IMAGING DEVICE

[75] Inventor: James D. Burke, Sierra Madre, Calif.

[73] Assignee: The United States of America as represented by the Administrator of the National Aeronautics and Space Administration, Washington, D.C.

[21] Appl. No.: 205,899

[22] Filed: Jun. 13, 1988

[51] Int. Cl.⁴ .............................................. B64D 1/00
[52] U.S. Cl. .............................. 244/1 R; 244/138 A; 358/109
[58] Field of Search ................ 244/4 R, 138 A, 34 R; 354/65; 358/109

[56] References Cited

U.S. PATENT DOCUMENTS

| | | |
|---|---|---|
| 1,341,783 | 6/1920 | Case . |
| 1,799,664 | 4/1931 | Williams . |
| 1,901,957 | 3/1933 | Girdwood . |
| 2,959,376 | 11/1960 | Saurma . |
| 3,134,902 | 5/1964 | Chase et al. ........................... 358/109 |
| 3,217,097 | 11/1965 | Pauli et al. ............................ 358/109 |
| 3,265,136 | 8/1966 | Wojciechowski et al. ..... 244/138 A |
| 3,273,834 | 9/1966 | Bower .............................. 244/138 A |
| 3,537,369 | 11/1970 | Estes ..................................... 354/65 |
| 4,218,702 | 8/1980 | Brocard et al. ....................... 358/109 |
| 4,243,190 | 1/1981 | Sams . |
| 4,267,562 | 5/1981 | Raimondi ............................. 358/109 |
| 4,533,945 | 8/1985 | Lauvray et al. ..................... 358/109 |
| 4,697,761 | 10/1987 | Long .................................. 244/53 R |

FOREIGN PATENT DOCUMENTS

| | | |
|---|---|---|
| 167628 | 11/1954 | Australia . |
| 2845687 | 5/1979 | Fed. Rep. of Germany . |
| 503180 | 3/1920 | France .............................. 244/34 R |
| 793980 | 12/1935 | France . |
| 2412693 | 7/1979 | France . |

Primary Examiner—Joseph F. Peters, Jr.
Assistant Examiner—Anne Sartelle
Attorney, Agent, or Firm—Thomas H. Jones; John R. Manning; Charles E. B. Glenn

[57] ABSTRACT

An imaging device that automatically rotates upon descent through an atmosphere provides an onboard image detector a sweeping panoramic scan as it descends. No moving parts or propulsion system are required. The location, angle and pitch of the winged structure, together with its inertia properties, passively induces rotation. The angled location of the image detector takes advantage of the resulting rotation. Data generated by the image detector may be transmitted to a remote receiver or, alternatively, stored for subsequent recovery.

9 Claims, 2 Drawing Sheets

ATMOSPHERIC AUTOROTATING IMAGING DEVICE

The invention described herein was made in the performance of work under a NASA contract, and is subject to the provisions of Public Law 96-517 (35 USC 202) in which the Contractor has elected not to retain title.

BACKGROUND OF THE INVENTION

1. Field of the Invention

The present invention relates generally to a scanning imaging device for deployment in either terrestrial or extraterrestrial atmospheres, and more particularly pertains to a simple device in which no moving parts or propulsion systems are employed to impart a rotational motion to the device necessary for the scanning operation.

2. Description of the Prior Art

Reconnaissance of an area is often most efficiently accomplished via an aerial view. The necessary optical or electronic, or electro-optic equipment, is either lifted over or trajected across the territory to be surveyed. Aircraft, missiles and satellites normally fulfill such functions.

Similar reconnaissance of extraterrestrial expanses such as the surface of Mars or Venus considerably complicates matters. The compounding energy requirements demand absolute minimization of the weight of such a device. In addition, the technical complexity required for controlling a device at such distances is staggering. Probes in the past have either been flown by such targets, placed in an orbit, or have been hard-landed or even soft-landed on the surface. The weight and complexity of such programs increases geometrically as one progresses from a fly-by to a soft landing.

There are inherent disadvantages associated with such approaches. The fly-by spacecraft typically passes by the target planet at a considerable distance and at very high speed, thereby allowing only an image of low resolution to be acquired. An orbiting probe can more closely approach atmosphere fringe zones, but the speeds required to stay in orbit are considerable, and for long-lived orbiters contact with the atmosphere is preferably avoided. A probe in orbit is still usually substantially above the surface, diminishing the resulting ability of the imaging device to provide a high resolution image. In addition, some sort of controlling device is required to keep the image detector aimed at the surface and perhaps additionally performing a scanning motion. Hard-landed probes, while perhaps affording a closer view of the surface, have the inherent disadvantage that the time period in which the atmosphere is traversed or until the probe is destroyed is extremely short. Soft-landed probes offer the most potential as far as generating a detailed image is concerned.

A further consideration is the manner in which an image is generated. The tradeoffs betwen a wide angle low resolution view and a narrow angle high resolution view would dictate a composite of a plurality of narrow angle high resolution views. Such an approach requires scanning of the image, and necesarily adds complexity to the probe. Movement of the probe or movement of the detector within the probe is thereby required. The technical complexity of sending such a probe such a large distance and then causing it to scan as it descends adds up to a very complex system.

Similar problems of weight, control and technical complexity are also inherently associated with reconnaissance of the earth's surface. Such terrestrial probes can benefit from the same breakthroughs and improvements imparted to extraterrestrial probes.

SUMMARY OF THE INVENTION

An object of the present invention is to provide an imaging device that is capable of scanning a field of view as it descends through the atmosphere.

Another object of this invention is that the whole device rotates as it descends, thereby imparting a passive scanning capability to the image detector.

A further object of the invention is that the rotation is induced automatically upon descent through an atmosphere without the use of a propulsion system, the expenditure of fuel or stored energy.

Yet another object of the invention is that the rotation-inducing structure have no moving parts, be relatively inexpensive to manufacture and simple in design.

Another object of the invention is that the imaging device be able to store image data for later reocvery, or alternatively, be able to transmit image data as it is gathered.

Another object of the invention is that the device be able to provide data regarding its orientation and spin rate.

According to the present invention, the foregoing and other objects are attained by a device having a winged structure so located, pitched and angled that autorotation is induced upon descent through an atmosphere. An image detector supported by the winged structure is aimed downwardly at an angle to the axis of rotation so that a panoramic view is scanned with each rotation of the device. A composite image is assembled as the field of view scanned by the image detector sweeps a decreasing radius spiral to the target. Data gathered during the descent can be stored for later recovery, or can be continuously transmitted to a receiver. Power may be supplied by an onboard power supply or via solar panels adapted to the upper surface of the winged structure. A small line-array sun sensor may be adapted to the device to aid in subsequent image processing by providing orientation and spin rate data.

BRIEF DESCRIPTION OF THE DRAWINGS

Other objects andmany of the attendant advantages of this invention will be readily appreciated as the same becomes better understood by reference to the following detailed description when considered in conjunction with the accompanying drawings in which like reference numerals designate like parts throughout the figures thereof and wherein.

DETAILED DESCRIPTION OF THE DRAWINGS

Figure 1:
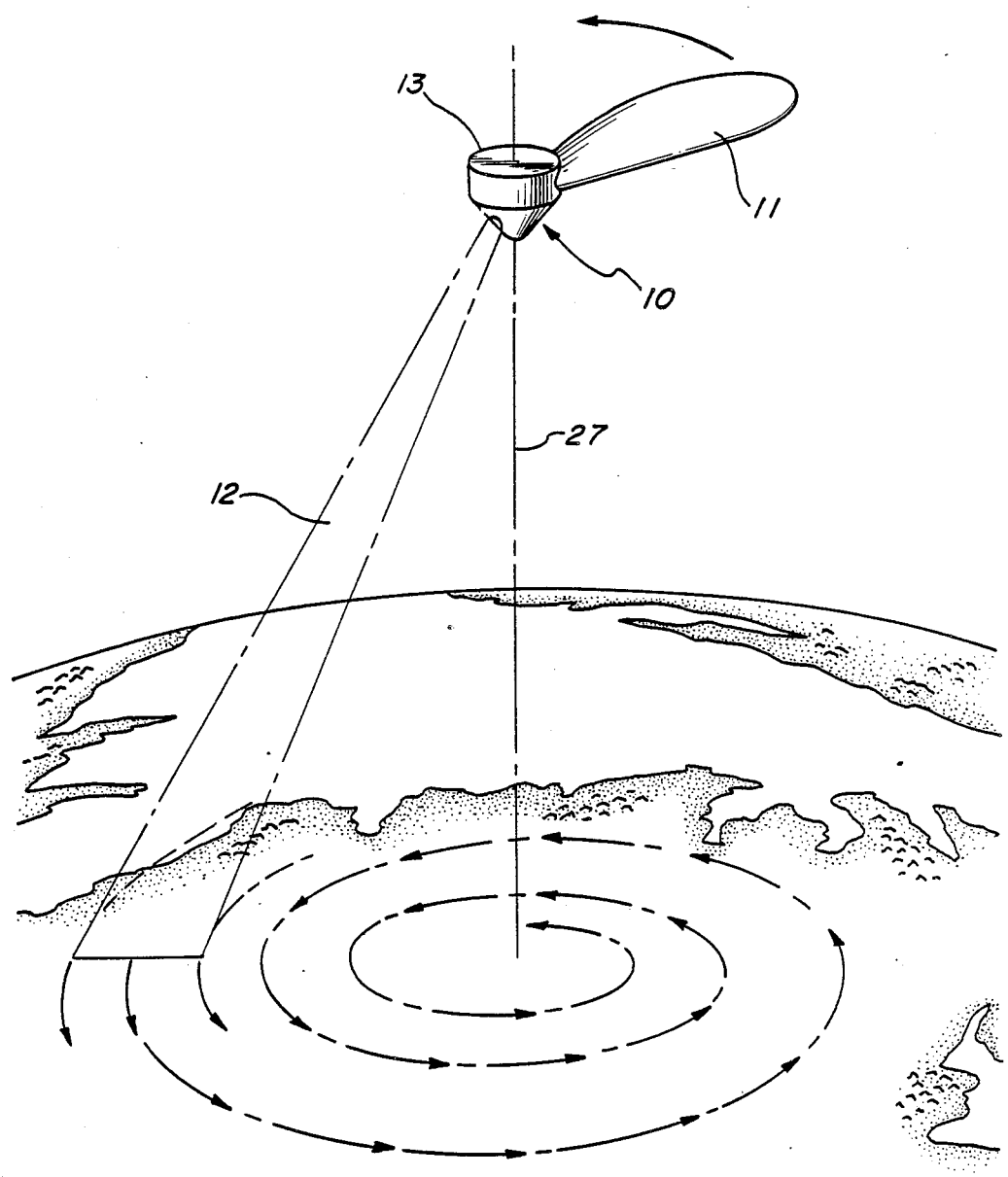
FIG. 1 illustrates an embodiment of the device descending through an atmosphere and sweeping out a decreasing radius field of view.

The device of the present invention is intended to be deployed at altitude in an atmospheric environment subject to a gravitational field. FIG. 1 illustrates an embodiment 10 of the present invention descending through an atmosphere as rotation thereof avails a decreasing radius sprial field of view 12 to the iamge detector 15 contained therein.

Figure 2:
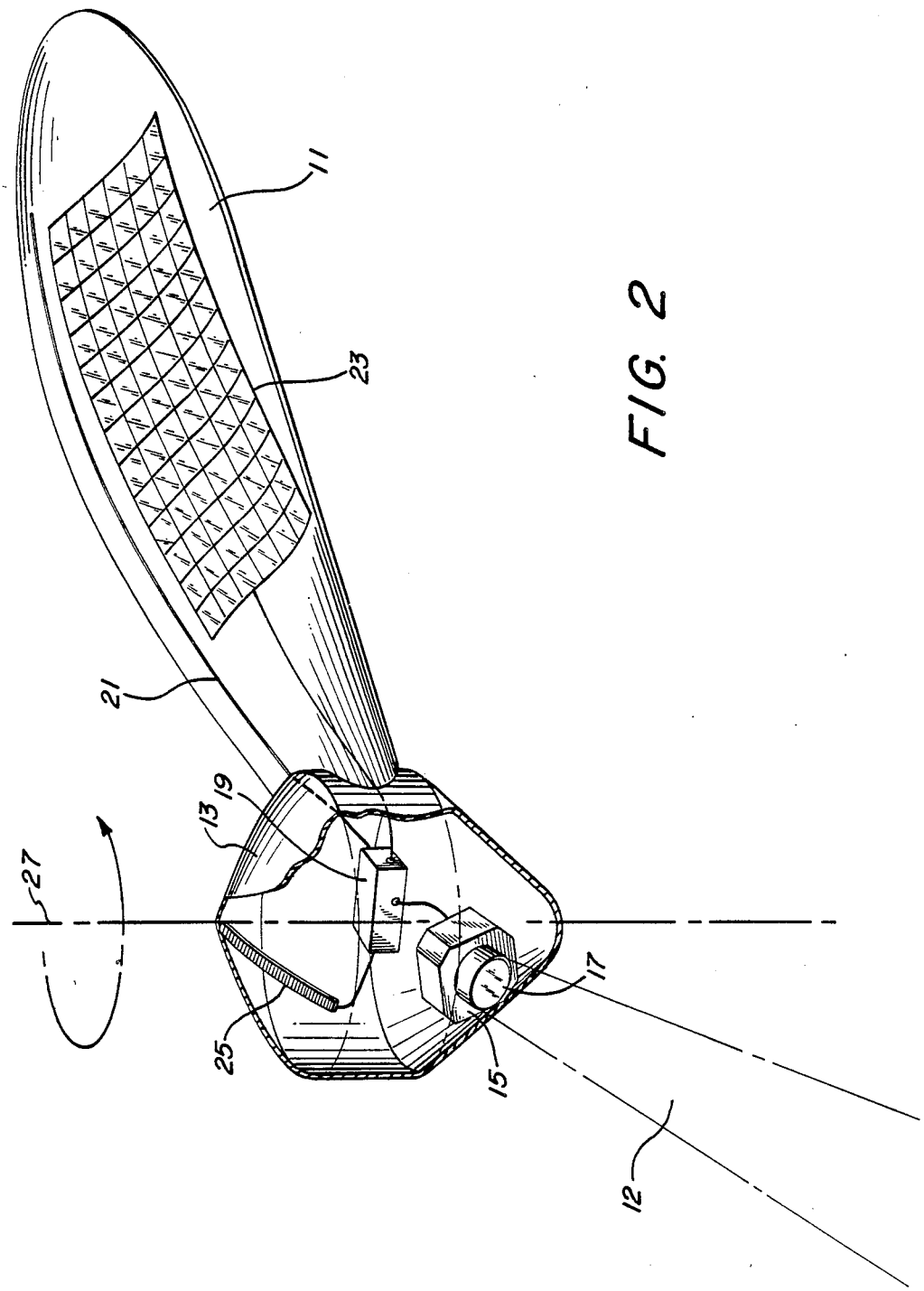
FIG. 2 is a partially cut-away perspective view of an embodiment of the device illustrating some of the major components.

FIG. 2 is a perspective view of an embodiment of the present invention illustrating the placement of various components therein. The most prominent feature is the wing-like structure 11 attached to the central pod 13.

The central pod contains an image detector 15 which is capable of receiving an image through the optics 17 or other receiving means disposed at an oblique angle to the axis of rotation 27. A transmitter 19 is also disposed within the pod. The transmitter is capable of receiving data gvenerated by the image detector and transmitting it to a remote receiver via antenna 21. A solar panel 23 supplies electrical power as required by the image detector and transmitter. Alternatively, a stored power supply such as a battery can be incorporated within the device. A line array sun sensor 25 is placed on a top surface of the device. Its output is transmitted via transmitter 19 and antenna 21 to provide data necessary to determine spin rate and orientation.

A critical consideration in the design of the imaging device lies in the selection of a particular wing structure and the distribution of weight throughout the entire structure. The wing design parameters depend upon the intended use or performance of the imaging device. Proper consideration must be given to the pressure and density of the atmosphere through which the device is to descend, the gravitational force it will be subject to, the payload, and the desired rate of descent and rotation. An imaging device intended for deployment in earth's atmosphere will appear markedly different from a device designed for deployment in the Martian atmosphere or the atmosphere of Venus.

All the usual aerodynamic considerations apply in selecting the appropriate wing area to payload ratio, wing span, mean aerodynamic chord, pitch, curvature and wing profile. A large body of knowledge is available to provide the specifics of wind design for terrestrial application. Other environments would require further considerations, such as, for example, the carful application of low-Reynolds-number airfoil theory for devices to be deployed on Mars. Wing structure is not limited to a single, asymmetrically placed surface, but may have two or more wings to satisfy the aerodynamic requirements. While a single wing design represents the simplest and most elegant design, a multiwing structure symmetrically arranged about the axis of rotation offers the advantage of reducing the amount of nutation to provide a somewhat stabler platform for the image detector. Descent of the device through an atmosphere will induce autorotation about the center of gravity. Components within the central pod must therefore be distributed accordingly.

The device is not limited to deployment in a gaseous environment. Proper adjustment of the design parameters can yield a device that is serviceable in, for example, an aqueous environment, or any other fluid that may be encountered through which such a device is to descend to gather image data.

The selection of construction materials is dependent upon the intended mission. A predominant consideration is the weight of the device, tempered by the strength requirements. Chemically hostile atmospheres may preclude the use of certain materials. Expected temperatures and temperature ranges may have a further influence on the selection of materials. Depending on the ode of deployment, high entry speeds may be a factor and will affect the choice of materials accordingly as augmented heat loads and aerodynamic loads may be encountered.

A device suitable for deployment in the earth's atmosphere may be constructed form a combination of composite materials. For instance, fiber-reinforced resins may be used to form the central pod. Mylar film over polystyrene spars may be used to fashion the wings. Carbon fiber materials can be usd to enhance the strength to weight ratio of various components. A device using the above-indicated mateials having a wing span of approximately 60 centimeters is capable of carrying a 200-gram payload and autorotating at approximately 5 revolutions per second.

Alternatively, a devic intended for deployment in the Martian atmosphere having a wing span of approximately 1 meter is capable of carrying a 100 to 200 gram payload at an autorotation rate of 1 revolution per second.

The selection of an image detector depends upon its intended mission. It is necessary that in order to take advantage of the autorotating, i.e., auto scanning, character of the device, the image detector must be aimed at an angle to the axis of rotation. This ensures that a panoramic view is afforded the image detector as the device rotates. The actual angle of inclination depends upon the field of view of the detector, the amount of overlap desired, the resolution required of the detected image, and the pitch angle of the descent helix. As the autorotating imaging device descends, the field of view swept out by the image detector follows a path of decreasing radius similar to a needle following the grooves of a phonograph record to the center.

A number of different modes for detecting an image are available. For instance, the detector can take a series of sequential photographs of the image as it scans. A motorized auto-advance film camera could fulfill such a function and would be a viable solution for a reconnaissance mission in which the imaging device is recoverable, but would involve some complexity and moving parts. Alternatively, continuously updated image data can be generated as the image sweeps past. The image is focused on a single line array charge coupled device (CCD) arranged perpendicularly to the direction of the scan. For example, a 1024-pixel line of Reticon line array CCD's would adequately provide the required data. The CCD's could be sensitive to visible light, only selected wavelengths therein or, for example, IR radiation. Both the detector's sensitivty, as well as the focusing means 17, must be selected in accordance with the type and range of radiation to be detected. The resulting data, in either analog or digital form, can either be stored or immediately transmitted to a remote receiver. The transmitter located onboard the imaging device can fulfill such a function.

For extraterrestrial exploration, recovery of stored data after a landing on'the surface may not be a desirable alternative. In such a case, transmission of the data to an orbiting receiver is required. For example, a simple VHF-FM radio transmitter can be employed for the transmission of analog data, while a VHF-PCM transmitter can be used to transmit digital information. Such signals could, for example, be effectively transmitted from an imaging device descending through the Martian atmosphere to a receiver in orbit with a signal strength of between 300 mW to 2W. On the other hand, it is conceivable for various reconnaissance missions on earth that subsequent recovery of the imaging device after landing is quite feasible. In that case a simple camera using photographic film could be used wherein the exposed photographic film fulfills the data storage function.

Any pwer requirements the image detector or the transmitter may have could be supplied by an onboard power supply. Batteries or a fuel cell could conceivably be employed to fulfill the function. If, on the other hand, deployment in a sunlit environment is intended, solar panels could serve to further reduce the weight of the deivce. A bank of solar panels or solar cells affixed to an upper surface of the device such as on the upper surface of the wing can supply the necessary electricity to fulfill the power requirements of the image detector and a transmitter. An array of 500 standard photocells could generate 10W sufficient to power a transmitter braodcasting a 2W signal.

Another feature that can be incorporated in the imaging device, where appropriate, is a line array sun detector 25, which generates signals indicative of the location of a light source. A single line array of Reticon 1024-element CCD's can be positioned on the surface of the imaging device so as to yield a signal peak every time the sun or other light source sweeps past. Such signals can be interpreted to determine the orientation of the device, and used to aid in image processing. Data generated by the device can also provide a measure of the spin rate as the device descends.

In conclusion, the autorotating imaging device of the present invention provides an extremely simple and relatively inexpensive alternative for a probe design capable of generating a great quantity of imaging data. Deployment of a plurality of such devices can provide a viable and economical alternative to a more complex scanning system which may or may not require horizontal travel through the atmosphere.

Obviously, many modifications and variations of the present invention are possible in light of the above teachings. It is therefore to be understood that within the scope of the appended claims, the invention may be practiced otherwise than as specifically described.

What is claimed is:

1. An autorotating imaging device for deployment in a fluid subject to a gravitational force, comprising:
   a housing;
   an image detection means fixedly located within said housing for detecting an image angularly displaced from the axis of rotation of said housing; and
   a wing member comprising a single aerodynamic surface radially attached to one side of said housing for imparting rotation to the housing upon descent through the fluid;
   whereby the image detection means is afforded a sweeping panoramic view as the housing rotates.

2. The imaging device of claim 1 further comprising data generation means located in said housing for generating data representative of the image detected by the image detection means.

3. The imaging device of claim 2 further comprising transmitting means located in said housing for transmitting data generated by the data generation means.

4. The imaging device of claim 3 further comprising a plurality of photovoltaic cells affixed to an upper surface of the imaging device to generate electricity necessary to satisfy the power requirements of the imaging device.

5. The imaging device of claim 4 further comprising a line array sun sensor located on a surface of the imaging device for generating data for determining orientation and spin rate.

6. An autorotating imaging device for development in a fluid subject to a gravitational force, comprising:
   a housing;
   an image detection means fixedly located within said housing for detecting an image angularly displaced from the axis of rotation of said housing;
   a wing member rigidly attached to said housing for imparting rotation to the housing upo descent through the fluid, whereby the image detection means is afforded a sweeping panoramic view as the housing rotates;
   data generation means located in said housing for generating data representative of the image detected by the image detection means; and
   storage means located in said housing for storing the data generated by the data generation means.

7. An autorotating imaging device for deployment in an atmospheric environment, comprising:
   a housing;
   a single wing radially projecting from said housing, angled, pitched and configured so as to induce a rotation of the housing about a central axis of rotation upon descent through the atmosphere;
   an image detector disposed within the housing so as to be exposed to a field of view angularly offset from the axis of rotation;
   a data generation means disposed within the housing for quantifying an image detected by the image detector; and
   a transmitter disposed within the housing for transmitting data generated by the data generator to a remote receiver;
   whereby a decreasing radius spiralled field of view is afforded the image detector as the imaging device rotates and descends through the atmosphere.

8. The imaging device of claim 7 further comprising photovoltaic cells attached to an upper surface of the device to generate electricity to power the image detector, data generation means and transmitter.

9. The imaging device of claim 7 further comprising a line-array sun sensor attached to an upper surface of said device, said sun sensor capable of generating data from which orientation and spin rate can be determined.

* * * * *